United States Patent [19]

Albrecht et al.

[11] Patent Number: 4,867,929
[45] Date of Patent: Sep. 19, 1989

[54] PROCESS FOR FORMING A FLANGE ON A HOLLOW BODY OF THERMOPLASTIC MATERIAL

[75] Inventors: Peter Albrecht, Hamburg; Adolf Appel, Egestorf; Karl-Heinz Balkau, Oststeinbek; Claus Horwege; Wolfgang Reymann, both of Hamburg, all of Fed. Rep. of Germany; Peter Rose, Potomac, Md.; Klaus Vogel, Barsbüttel, Fed. Rep. of Germany; Walter Wiedenfeld, Hamburg, Fed. Rep. of Germany

[73] Assignee: Krupp Corpoplast Maschinenbau GmbH, Fed. Rep. of Germany

[21] Appl. No.: 123,837

[22] Filed: Nov. 23, 1987

[30] Foreign Application Priority Data

Feb. 25, 1987 [DE] Fed. Rep. of Germany ....... 3705948

[51] Int. Cl.⁴ .................. B29C 53/08; B29C 53/82; B29C 57/04
[52] U.S. Cl. ................................. 264/521; 264/296; 264/322; 264/534; 264/573; 425/387.1; 425/398; 425/400; 425/410; 425/415; 425/419; 425/423
[58] Field of Search ........ 264/572, 322, 534, 294–296, 264/573; 425/387.1, 393, 397, 398, 400, 407, 410, 412, 414–416, 419, 423

[56] References Cited

U.S. PATENT DOCUMENTS

| | | |
|---|---|---|
| 3,205,290 | 9/1965 | Covington, Jr. et al. . |
| 3,284,560 | 11/1966 | King et al. . |
| 3,492,387 | 1/1970 | Larson . |
| 3,509,252 | 4/1970 | Baehr .................. 264/322 |
| 3,514,468 | 5/1970 | Sutcliffe et al. . |
| 3,843,300 | 10/1974 | McFarlane .............. 264/322 |
| 3,929,959 | 12/1975 | Findlay et al. . |
| 3,929,960 | 12/1975 | Findlay et al. . |
| 4,134,949 | 1/1979 | McGregor . |
| 4,297,306 | 10/1981 | Yoshino et al. .......... 264/533 |
| 4,420,454 | 12/1983 | Kawaguchi et al. . |
| 4,564,495 | 1/1986 | Nilsson et al. . |
| 4,704,243 | 11/1987 | Nilsson et al. ............ 264/534 |

FOREIGN PATENT DOCUMENTS

| | | |
|---|---|---|
| 1704405 | 7/1971 | Fed. Rep. of Germany . |
| 230176 | 3/1977 | France . |
| 2516855 | 5/1983 | France . |
| 2534519 | 4/1984 | France . |
| WO86/00565 | 1/1986 | PCT Int'l Appl. . |
| 1352002 | 5/1974 | United Kingdom . |
| 2052364A | 1/1981 | United Kingdom . |
| 2085798A | 5/1982 | United Kingdom . |
| 2090786A | 8/1982 | United Kingdom . |
| 2092943A | 8/1982 | United Kingdom . |

Primary Examiner—Jan H. Silbaugh
Assistant Examiner—Neil M. McCarthy
Attorney, Agent, or Firm—Panitch Schwarze Jacobs & Nadel

[57] ABSTRACT

A process and an apparatus for forming a flange on the wall portion of a hollow body of thermoplastic material with an opening at one end provides that the end part of the wall portion which defines the opening is heated and contracted by means of a force acting on the end portion from the outside thereof over the periphery thereof, whereupon the contracted end part is subjected to a pressing operation to form a flange extending around the contracted end part.

13 Claims, 5 Drawing Sheets

PROCESS FOR FORMING A FLANGE ON A HOLLOW BODY OF THERMOPLASTIC MATERIAL

BACKGROUND OF THE INVENTION

The present invention relates generally to a process for forming a flange on a hollow body of thermoplastic material, and apparatus for carrying out such a process.

The above-mentioned hollow body which is to be provided with a flange configuration may be for example a hollow molded article or blank which comprises a substantially cylindrical wall portion defining an opening at one end and having a bottom at the other end, thus providing a can-like shape. The flange to be provided on the can shape constitutes for example a beaded mounting edge for mounting a cover or lid member thereon. The blank which is to be provided with the flange may be produced by means of various processes, one of which provides that a preform which is produced for example by injection molding and which comprises a substantially cylindrical wall portion, a bottom portion at one end and an opening at the other end, is converted into an intermediate product by stretching of the cylindrical wall portion at a temperature below the vitreous transition temperature of the material forming the preform, the intermediate product then being subjected to a preliminary expansion operation at its open end and then, starting from that open end in pre-expanded condition, expanded at least over the major part of its longitudinal extent and then subjected to thermofixing to establish the configuration of the blank. The above-mentioned flange or beaded edge portion is then formed on the thermofixed blank. It is also possible however for a can-like hollow body of that nature to be produced by means of a stretching blowing process which involves using a blowing mold to produce an initially substantially closed hollow body whereupon, to produce the opening in the hollow body, the end region of the blank which is remote from the end portion thereof is cut off. Both those forms of process result in an article in which at least the material forming the wall portion is oriented in order thereby to improve its mechanical characteristics and properties.

Irrespective of the method of manufacture of the hollow body on which a flange is to be formed and irrespective also of the use to which such a hollow body is subsequently to be put, in most cases the final article is a mass-produced article which is to be manufactured in large numbers so that the operating procedure involved in the process, and also the equipment used for carrying the process into effect, should be as simple and as straightforward as possible, so that it is accordingly reliable.

SUMMARY OF THE INVENTION

An object of the present invention is to provide a process for forming a flange on a hollow body of thermoplastic material, which is better suited to provide for economical mass production of the hollow bodies.

Another object of the present invention is to provide a process for forming a flange on a hollow body of thermoplastic material, which is carried out in such a way that the operations to be performed as part thereof and more rationally matched to each other such as to provide for optimum utilisation of the tools and equipment required for dealing with said hollow bodies.

Yet another object of the present invention is to provide a process for forming a flange on a hollow body of thermoplastic material, such as to minimise the heating effect required and the number of items of heating equipment involved in heating the hollow body.

Still another object of the present invention is to provide a process for producing a flange on a hollow body of thermoplastic material by deformation of an end portion thereof, wherein the largest diameter of said flange is no larger than the outside diameter of the remaining cylindrical region of said hollow body.

A further object of the present invention is to provide an apparatus for producing a flange on a hollow body of thermoplastic material, which permits successive steps in the operation of forming the flange to be carried out in a simple and rational fashion.

Yet a further object of the present invention is to provide an apparatus for producing a flange on a hollow body of thermoplastic material by deformation of an end portion thereof, which permits improved control of the flange configuration produced thereon.

A still further object of the present invention is to provide an apparatus for shaping a flange on a hollow body of thermoplastic material by controlled deformation of an end portion thereof such as to provide for consistency of shaping of said flange from one hollow body to another.

In accordance with the present invention, those and other objects are achieved by a process for forming a flange on a hollow body of thermoplastic material which comprises a substantially cylindrical wall having first and second ends with an opening at the first end thereof, wherein the end portion of the said wall which defines said opening is heated and reduced in size by the application of forces acting on said end portion from the outside thereof over the periphery thereof, and a flange which extends around the hollow body is then formed on said reduced end portion, by a pressing operation.

In an advantageous embodiment of the process, the operation of reducing the size of the end portion of the hollow body is effected at the same time as the step of heating same and in dependence on the softening effect caused thereby of the material forming the end portion of the hollow body. That can be effected by passing over the end portion of the hollow body a first tool which is substantially annular in cross-section and whose internal configuration reduces in size towards the end thereof which is remote from the hollow body, thereby corresponding to the reduction in size to be produced at the end portion of the hollow body. The tool is subjected to the force of a spring acting thereon towards the hollow body, while the wall of the tool which comes into contact with the end portion of the hollow body is at a temperature which is such as to cause softening of the end portion to be reduced in size. The force applied to the tool by the spring is such that deformation which causes the reduction in size of the end portion occurs only upon the attachment of a given temperature and a degree of softening caused thereby in the end portion of the wall which is subjected to the action of the tool.

Particularly in that treatment operation, account should be taken of the fact that, particularly when the hollow body is in the form of a can-like container, it will generally be of a very thin wall gauge, so that the forces acting on the hollow body must in any event be so controlled and distributed as to avoid undesirable and in particular irregular deformation of the hollow body such as for example the formation of folds or corrugations therein due to an upsetting effect. That applies in particular in regard to those shaping operations in which the blank is not supported and held over its entire extent by means of appropriate support and holding elements, in such a way that the hollow body can undergo deformation only when and only where the support and holding elements are not actively involved in engaging the blank but leave liberated the parts of the blank which are to be subjected to deformation for the purposes of carrying out the shaping operation. The above-described mode of operation in accordance with the principles of the present invention gives the advantage that a comparatively low force is sufficient to reduce the size of the end portion of the hollow body as set forth above, that force acting on the end portion of the hollow body by the application thereto of the annular tool. That shaping operation is carried out without being governed by a positive control procedure, in other words, the degree of softening of the end portion which is to be reduced in size determines the duration of the operation, with a given force acting on the tool. It is thus possible to eliminate a positive actuating arrangement for governing the period of operation of the tool, although it will be appreciated that certain fluctuations in regard to the duration of the operation of reducing the size of the end portion of the hollow bodies may possibly occur from one hollow body to another, although such fluctuations tend to remain very slight having regard to the fact that the wall thickness of the portion to be reduced in size generally has no or only slight fluctuations. In order to keep the length of the reduced end portion constant from one hollow body to another, it is desirable for the distance to be covered by the tool during the operation of reducing the end portion of the hollow body to be restricted, for example by means of a suitable abutment.

In an advantageous embodiment of the process according to the invention, the hollow body is under an increased internal pressure during the step of producing the reduction in size of the end portion thereof. That pressure may be produced by compressed air which is advantageously introduced into the hollow body through a passage provided in the tool.

The second step in the shaping operation, which involves forming the flange on the reduced end portion of the hollow body, is advantageously effected making use of the heat which had been applied to the end portion of the hollow body for the purposes of reducing the size thereof in the course of the first step in the process. That is possible at any event when the individual steps in the process are so matched to each other that there is only a short interval between the end of the operation of reducing the size of the end portion of the hollow body and the subsequent pressing operation for producing the flange thereon. That mode of operation is also assisted by virtue of the fact that in the first step in the process, the heat treatment which thus involves increasing the temperature of the end portion is effected by the first annular tool which remains in contact with the end portion until the end of that step and which therefore also transfers heat to the end portion of the hollow body, up to the end of the first step in the operating procedure of the process of the invention.

For the purposes of forming the flange on the hollow body, the hollow body may be moved with the reduced end portion thereof into the region of a second tool which comprises a bottom portion having a recess or opening therein, the internal configuration of which is adapted to the shape of the flange to be produced on the hollow body, and a punch member having an end region which is introduced into the recess or opening in the bottom portion of the tool and the end portion which is disposed therein of the hollow body. The region of the punch member which co-operates with the wall of the hollow body when the punch member is introduced thereinto is of such a shape that, as it is introduced, it initially expands the end portion of the hollow body and in the final phase of the operation of introducing the punch member into the hollow body, the peripherally extending flange is shaped by pressing between the bottom portion of the tool and the punch member, the deformed region of the hollow body then being cooled until it is in a condition of adequate stability in respect of shape.

In a preferred feature of that process, the pressing tool which is used for shaping the flange on the hollow body may serve at the same time for cooling the shaped region of the wall portion thereof. If necessary, at least one of the two tools may be cooled, for example by means of a cooling fluid which is passed through a passage system provided within the pressing tool. Whether such a special cooling system is necessary or desirable depends on the respective circumstances involved, for example the wall thickness of the hollow body and thus the amount of heat which has to be removed therefrom. If, prior to the operation of reducing the end portion of the hollow body, the hollow body has been subjected to a thermofixing operation in order to impart thereto the necessary degree of thermal stability required for future use thereof, then the operation of reducing the end portion of the hollow body and the subsequent step of shaping the flange by pressing thereof should be carried out at a temperature which is above the thermofixing temperature. When using for example PETP, the thermofixing temperature may be around 150° C.

In another preferred feature of the present invention the hollow body may be subjected to an increased internal pressure during the operation of forming the flange by pressing thereon. That is intended to prevent the wall portion of the hollow body experiencing further undesired and uncontrollable deformation under the effect of the forces acting thereon to produce the flange-shaping operation. Furthermore, it may be advantageous for the wall portion of the hollow body to be supported on the outside by a support wall structure surrounding same, during the operation of shaping the flange by pressing of the end portion of the hollow body, thereby to prevent the hollow body which is under an increased internal pressure from bulging out. The use of such a support wall structure will generally depend on the thickness of the wall portion of the hollow body as the rigidity thereof increases with increasing thickness.

In order to achieve a high level of productivity, an advantageous embodiment of the process of the invention provides that the step of reducing the end portion of the hollow body on the one hand and the step of forming the flange by pressing thereon on the other hand are carried out in first and second treatment stations which are separated in space from each other so that for example the end portion of the hollow body is being reduced in size in the first station at the same time as the other station is involved in carrying out the operation of producing the flange on the hollow body which precedingly passed through the first station.

In a further aspect of the invention, the above-indicated objects of the present invention are attained by an apparatus for forming a flange on a hollow body of thermoplastic material which a substantially cylindrical wall portion having first and second ends with an opening at the first end thereof, comprising a first tool of annular cross-section which can be moved over the end portion of a hollow body and which is heated, the inside diameter of the first tool, at the side towards the hollow body over which it is to be moved, being at least as large as the outside diameter of the end portion of the hollow body prior to the deformation thereof to produce the reduction in size, and decreasing in accordance with the configuration of the reduced end portion of the hollow body towards the side of the tool which is remote from the hollow body. For the sake of improved handling and in particular also for the introduction of compressed air into the hollow body, the first tool may be closed at its side which is remote from the hollow body and may be provided with a supply means for compressed air. That means that the annular first tool may be for example of a generally hood-like or bell-like configuration, with the interior thereof, in the position in which it co-operates with the reduced end portion of the hollow body, representing a continuation of the space inside the hollow body, with the entire space constituted by the interior of the hollow body and the interior of the tool being closed in an upward direction, that is to say away from the hollow body, by the tool or at least a portion thereof, so that an increased pressure can be produced within the cavity defined by the interior of the hollow body and the interior of the tool, by the introduction of compressed air thereinto.

In a preferred embodiment of the apparatus according to the invention, the first tool is carried by the piston rod of a piston which is displaceable within a compressed air-actuated cylinder. Actuation of the piston is such that the resulting force which acts towards the hollow body is sufficient on the one hand to reduce the end portion of the hollow body when it is sufficiently heated and thus softened, while however not producing any undesirable and unacceptable deformation in the other regions of the hollow body, which have not been raised in temperature.

For the purposes of forming the flange on the reduced end portion of the hollow body, the apparatus of the invention has a second tool comprising a bottom portion with a circular recess or opening therein, the boundary of which is adapted to the outside contour of the flange to be formed on the hollow body, and a punch member whose end portion which is towards the hollow body in the operating position of the apparatus can be introduced into the recess in the lower portion and thus the end portion of the hollow body which is disposed therein, the end portion of the punch member being of such a configuration that it is adapted to the shape of the region of the bottom portion of the second tool, which extends around the outside of the reduced end portion of the hollow body and the flange to be formed therefrom. Desirably, the punch member is provided with means for the introduction of compressed air into the hollow body. The increased pressure produced by the feed of compressed air supports the wall portion of the hollow body at the inside thereof. It is also possible for the apparatus to include a sleeve which is arranged coaxially with respect to the hollow body and whose inside diameter is adapted to the outside diameter of the hollow body. The sleeve is axially displaceable relative to the hollow body and can be moved into a position in which it is disposed around and fits to the wall portion of the hollow body over at least the major part of the axial extent thereof, thereby to provide external support therefor.

The bottom portion of the tool for forming the flange on the hollow body is advantageously of a split or divided nature, for the purposes of removal of the flange therefrom after the flange forming operation. An annular locking element may be mounted on the punch member, being axially displaceable with respect thereto. In the course of the movement of the punch member towards the bottom portion of the tool, the locking element can be brought into engagement with the first and second parts of the bottom portion of the tool before the bottom portion is subjected to forces acting thereon by the punch member, in the course of the flange-shaping operation. In the same fashion, the external support sleeve which provides the outside support for the wall portion of the hollow body may be moved into engagement with the bottom portion of the tool, in the operative position of the sleeve, in order thereby to produce an additional locking action which prevents the bottom portion of the tool from coming open during the step of forming the flange on the hollow body.

In another advantageous feature of the apparatus of the invention, the first annular tool for reducing the end portion of the hollow body on the one hand and the second tool for forming the flange on the hollow body on the other hand are arranged in first and second treatment stations which are disposed at a spacing from each other so that a respective hollow body can be dealt with in each of those stations. The advantageously horizontal spacing between the first and second stations should be as short as reasonably possible, so that transportation of hollow bodies from the first station in which the operation of reducing the end portion of a hollow body is carried out into the second station in which the flange is formed on the hollow body takes up a small amount of time.

Further objects, features and advantages of the present invention will be apparent from the following description of a preferred embodiment thereof.

DESCRIPTION OF THE PREFERRED EMBODIMENT

Figure 1:
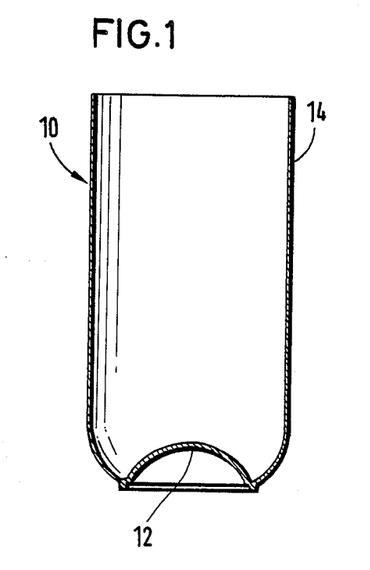
FIG. 1 is a side view of a hollow body of thermoplastic material in the form of a blank which represents an intermediate article for the production of cans, prior to carrying out the processing steps in accordance with the process of the present invention.

Referring firstly to FIG. 1, shown therein is the general configuration of the hollow body or blank which is to be subjected to processing in accordance with the process of the present invention, in the embodiment thereof described hereinafter. Each blank 10 substantially comprises a part-spherical bottom of end portion 12 which extends inwardly of the blank, and a cylindrical wall portion 14, the free end of which, being the upper end in FIG. 1, defines an opening. The blank 10 may be produced as an intermediate product from a preform using a drawing operation and a subsequent expansion operation, as described for example in French laid-open application No. 2 567 066 (application No. 85 10215). The wall of the blank 10 is for example from 0.4 to 0.5 mm in gauge. The bottom portion 12 is substantially thicker as it has not been affected by the preceding shaping operations which have respectively resulted in a reduction in the gauge or thickness of the wall portion 14. The wall portion 14 of a blank 10 produced in the above-described manner is oriented in the axial direction by virtue of the drawing operation. Orientation of the material forming the wall portion, in the peripheral direction, is effected by the expansion operation which follows the drawing operation.

It is also possible however for the article 10 to be produced by stretching-blowing procedure as described for example in German published specification (DE-AS) No. 2 222 535. In that case, orientation of the material forming the wall portion 14 is caused by an axial stretching operation and orientation of that material in the peripheral direction is caused by the expansion operation which is generally carried out by using an increased internal pressure.

Figure 4:
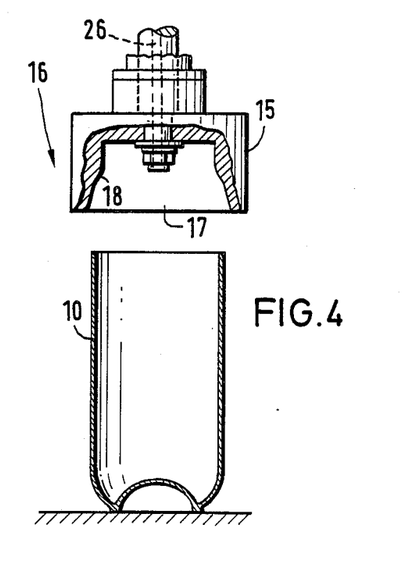
FIG. 4 is a diagrammatic side view of the blank in a first treatment station with the treatment tool in its starting position.

The blank shown in FIG. 1 is subjected in the process according to the invention to a shaping operation in each of two successive treatment steps. For that purpose, as shown in FIG. 4, the blank 10 is firstly introduced into a first treatment station indicated generally at 16, in which it is disposed beneath a first tool 15 and in substantially coaxial alignment therewith. The tool 15 is of an annular configuration in cross-section and is closed at its end remote from the blank 10, that is to say in an upward direction in FIG. 4, thus being of a bell-like or hood-like configuration. The tool 15 has an opening 17 which thus faces towards the blank 10. The inside diameter of the tool 15 decreases from its opening 17 towards it opposite closed side, that is to say upwardly in FIG. 4 as can be clearly seen therefrom, so that the configuration of the inside surface of the wall portion 18 is adapted to the configuration of the reduced or contracted end portion to be produced on the blank 10, as indicated at 20 in FIG. 2.

Figure 5:
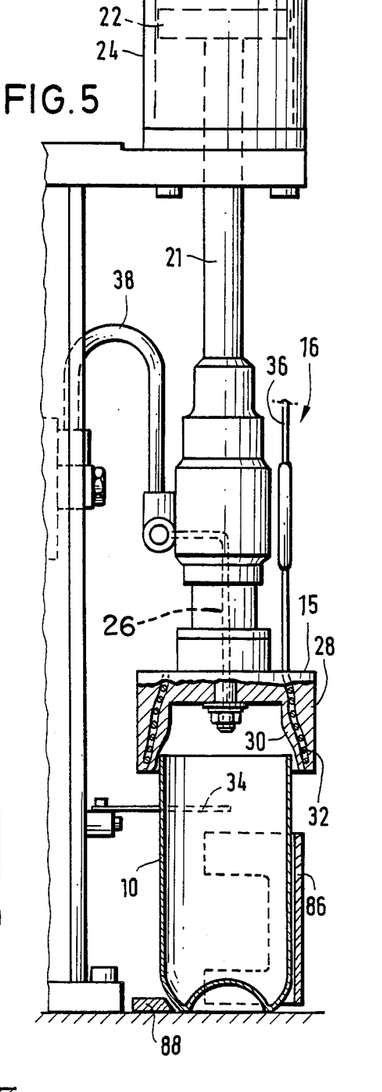
FIG. 5 is a view corresponding to that shown in FIG. 4, with the tool in an intermediate position.

Referring now also to FIG. 5, the tool 15 is carried by the piston rod 21 of a piston 22 which is guided slidably within a pneumatically actuated cylinder unit 24 and which is urged by pressure actuation of the cylinder unit 24 towards the blank 10 during the operation of forming the contracted end portion 20 thereon. The downwardly open interior of the tool 15 can also be connected to a compressed air source, for which purpose the piston rod 21 has a passage 26 for supplying compressed air. The compressed air is introduced into the passage 26 by way of the hose 38 in FIG. 5.

Referring still to FIG. 5, the tool 15 as illustrated therein essentially comprises an outer casing portion 28 and an inner portion 30 which is arranged coaxially with the casing 28. Arranged between the two parts 28 and 30 is a wire 32 which serves as an electrical heating resistance means for increasing the temperature of the inner part 30. The heating resistance means 32 is connected to a voltage source by way of a line 36.

Figure 6:
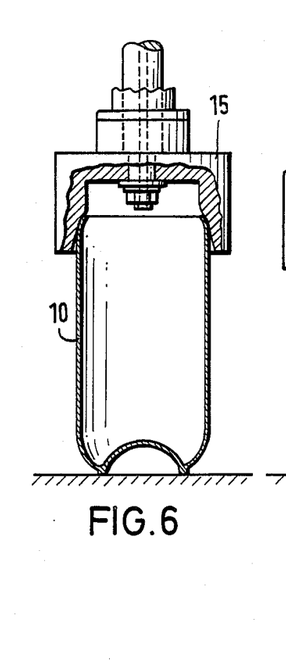
FIG. 6 is a view corresponding to that shown in FIG. 5, with the tool in a further intermediate position.
Figure 7:
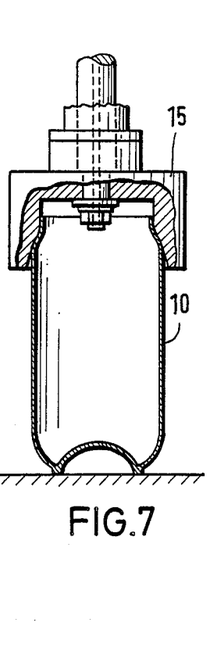
FIG. 7 is a view corresponding to that shown in FIG. 5, illustrating the tool in its final position.

The blank 10 which is introduced into the first station 16 by a conveyor pusher member 86 in FIG. 5 is aligned relative to the tool 15 in the station 16 by the pusher member 86, an abutment 88 and a fork 34. To carry out the first step in the process of the invention, in which the upper end portion 20 of the blank 10 is reduced in size or contracted, the tool 15 is lowered from its starting position shown in FIG. 4, on to the blank 10, as indicated in FIG. 6. The inside diameter of the opening 17 of the tool 15 is somewhat greater at its free end than the outside diameter of the substantially cylindrical blank 10. In the course of the downward movement of the tool 15, the blank 10 is first subjected to a fine alignment effect so that the blank 10 is aligned in precisely coaxial relationship with the tool 15 after a first contact has occurred, in the course of the downward movement of the tool 15, between the end portion 20 of the blank and the inner boundary wall surface 18 of the tool 15. In the course of that aligning operation in the first phase of the downward movement of the tool 15, axial forces can scarcely act on the blank 10, which, as already mentioned, is of a very thin wall gauge. It is at the latest after first contact has occurred between the tool 15 and the end portion of the blank 10 that compressed air is introduced into the blank 10 through the passage 26 so that an increased internal pressure is produced in the blank 10. That provides for supporting the wall portion 14 of the blank 10, which is now subjected to axial and also radial forces in the course of the further downward movement of the tool 15.

As the tool 15 is heated by way of the wire 32 forming the resistance heating means, contact between the inside wall surface 18 of the tool and the end portion 20 of the wall 14 of the blank results in a transfer of heat, in the course of which the thermoplastic material forming the end portion 20 of the hollow body 10 undergoes softening. In that condition the end portion 20 can be shaped and deformed by the application of relatively low forces. In order in any event to ensure that the movement of the tool 15 downwardly over the blank 10 and the extent to which the temperature of the end portion 20 is increased are matched to each other in such a way that the tool 15 moves downwardly over the blank 10 only in accordance with the degree of heating of the end portion 20 and the deformability caused thereby, the tool 15 is carried in the above-described manner by the piston rod 21 of the piston 22 which is slidable within the pneumatically operated cylinder 24 and which is urged towards the blank 10 during the shaping operation. That arrangement provides for automatically influencing and controlling the forces which act on the end portion 20 of the blank 10 which is to be shaped and thus also on the adjoining, non-heated regions of the wall portion 14 of the blank 10. The pressure acting on the piston 22 in the cylinder unit 24 may be readily adjusted in such a way that the resulting forces are on the one hand sufficiently high to deform the softened end portion 20 of the blank 10, which on the other hand being too low to cause undesired deformation of the blank 10, in particular also in the region thereof which has not been heated. In that connection the fact that the interior of the blank 10 has been subjected to an increased pressure therein by virtue of the compressed air introduced by way of the passage 26 plays an important part as it gives a support function and in particular prevents the relatively slender blank 10 from bending or buckling under the effect of the force applied thereto by the tool 15. In the same manner the interior of the end portion 20 of the blank is also subjected to the increased force therein so that, during the shaping operation, in the course of the downward movement of the tool 15, the end portion 20 is subjected to the effect of outwardly directed forces which are uniformly distributed over the periphery of the end portion 20 and which contribute to preventing irregular deformation of the end portion 20, for example due to the formation of folds or the like therein. Although the outwardly directed forces generated by the increased internal pressure in the blank are lower than the inwardly directed forces which are transmitted through the internal wall 18 of the tool 15, the latter forces however are only fully effective where the inner wall 18 is directly in contact with the end portion 20 of the blank 10.

Although the tool does not have any positive drive or control actuation in its downward movement over the blank 10 for the purposes of deforming the end portion 20 thereof, the distance covered by the tool 15 in that operation is limited in a suitable fashion, for example by means of an abutment. That ensures that on each blank 10 the end portion 20 is shaped in the first step of the process to the same extent, on the assumption that there is sufficient time for that purpose, being essentially determined by the temperature of the tool and the wall thickness of the end portion 20.

Figure 2:
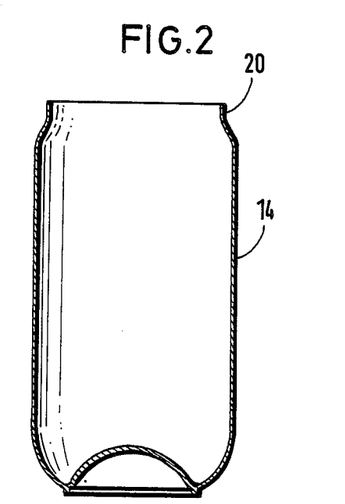
FIG. 2 is a side view of the article shown in FIG. 1 after a first step has been carried out, resulting in a reduced end portion on the hollow body.

At the end of the first step in the process, as described above, the blank 10 is of the configuration shown in FIG. 2 of the accompanying drawing.

After processing of the blank 10 in the first treatment station 16 is terminated, the blank with its contracted end portion 20 is moved into the second treatment station 40 by a conveyor means (not shown). Reference will therefore now be made to FIGS. 8 through 11 showing the second station 40.

Figures 8, 9, 10:
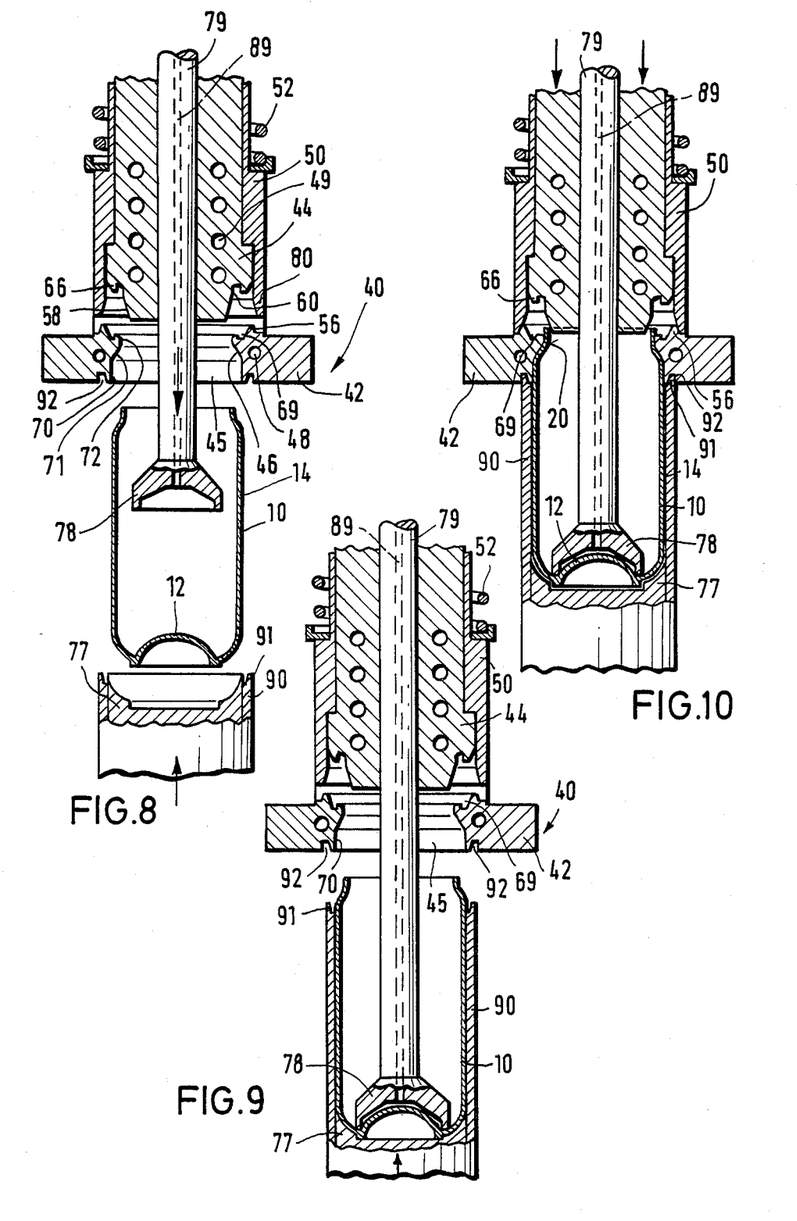
FIG. 8 is a view in longitudinal section of the blank during the operation of introducing same into the second treatment station.
FIG. 9 is a view corresponding to that shown in FIG. 8 of an intermediate stage in the operation of introducing the article into the second station.
FIG. 10 is a view corresponding to FIG. 8 showing the blank in the second station and the tools of the second station in their respective starting positions.
Figure 12:
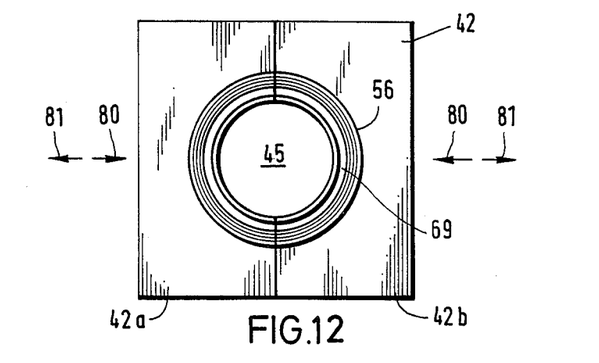
FIG. 12 is a view of the lower tool shown in FIG. 11 looking in the direction indicated by the arrows XII—XII.

Provided at the second station 40 is a two-part tool comprising a bottom portion 42 and a punch member 44 co-operating therewith. The bottom portion 42 is of a plate-like configuration and has a circular recess or opening 45, as shown in plan view in FIG. 12. The configuration of the wall 46 defining the opening 45, is cross-section, as shown in FIG. 8, corresponds to the definitive shape that the end portion 20 is to receive in the station 40.

The bottom portion 42 of the tool is divided into first and second halves 42a and 42b which are displaceable towards each other by suitable relative movement in a horizontal plane. The first and second halves 42a and 42b and the division therebetween can be clearly seen from FIG. 12. It will be appreciated that the halves 42a and 42b of the bottom portion 42 of the tool are shown in the closed position thereof in FIGS. 8 through 11.

Both the bottom portion 42 and also the punch member 44 are provided with ducts or passages 48 and 49 to carry a cooling agent.

The punch member 44 is further surrounded on its outside by an annular locking element 50 which is axially displaceable with respect to the punch member 44 and which is urged towards the free end 54 thereof by a coil spring 52 which is supported against the punch member 44 in a manner not shown in detail in the drawings. Associated with the annular locking element 50 is a peripherally extending projection 56 which extends on the top surface of the bottom portion 42 in coaxial relationship with the opening 45 therein.

The end portion 58 of the punch member 44 is of a tapering configuration towards its free end, being the bottom end in for example FIG. 8. Referring now also to FIGS. 13 through 16, adjoining the end portion 58 is a substantially cylindrical portion 60 which, at its end remote from the free end 54 (see FIG. 13) of the punch member 44, continues into a portion 62 which is of an arcuate configuration in longitudinal section lengthwise of the punch member 44, in such a way that, with the outside diameter of the punch member increasing in that portion 62, the portion 62 is of a configuration which corresponds to the desired configuration and the desired dimensioning of the flange to be formed on the hollow body 10. The portion 62 of arcuate configuration is delimited at its side remote from the substantially cylindrical portion 60 by a peripherally extending projection 66 which is clearly visible for example in FIG. 13. The inner boundary wall thereof, as indicated at 68 for example in FIG. 14, extends in substantially parallel relationship to the axis of the punch member 44, between the portion 62 and an edge formed by the projection 66. The projection 66 is arranged to co-operate with a peripherally extending groove indicated at 69 in for example FIG. 8 and FIG. 13, which is provided in the top surface of the bottom portion 42 of the tool, coaxially with the opening 45.

The wall 46 defining the opening 45 is substantially cylindrical in its lower region, as can best be seen for example from FIG. 8. The diameter of the region 70 corresponds to the outside diameter of the wall portion 14 of the blank 10 in the region thereof which remains non-deformed. Adjoining that substantially cylindrical region 70 of the wall 46 of the opening 45 is a region 71 which tapers in a substantially conical configuration towards the punch member 44 and which corresponds to the transition between the portion of the wall 14 of the blank 10, which has remained non-deformed, and the region of the end portion 20 which is the narrowest or most contracted region thereof after the contraction operation has been carried out in the first treatment station 16. Adjoining the tapering region 71 is a short substantially cylindrical region 72 which can again be seen from FIG. 8 and whose inside diameter is so adapted to the outside diameter of the cylindrical portion 60 of the punch member 44 that between the wall portion 72 on the one hand and the wall portion 60 on the other hand, there remains an annular gap or clearance which is filled by the appropriate part of the wall portion 14 of the blank 10.

Figure 13:
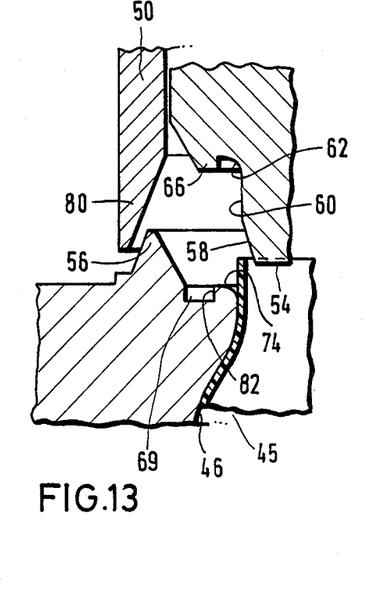
FIG. 13 shows a part of FIG. 10 on an enlarged scale.
Figure 14:
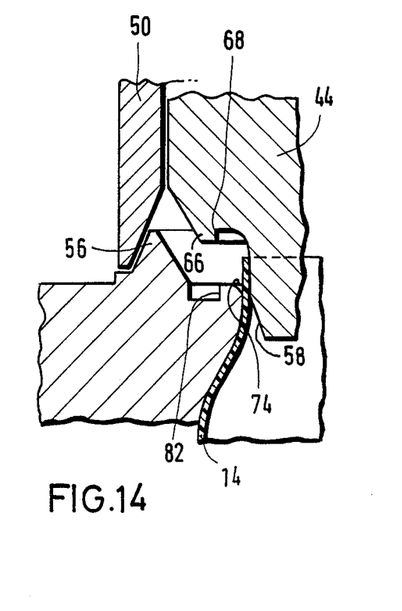
FIG. 14 is a view corresponding to that shown in FIG. 13 illustrating the co-operating portions of the two tools in an intermediate position.
Figure 16:
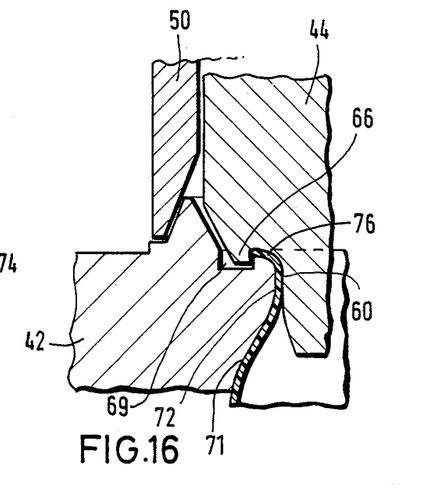
FIG. 16 shows the components illustrated in FIGS. 12 through 14 in their final position.

Disposed above the substantially cylindrical region 72 of the wall 46 of the opening 45 is a region 74 which in longitudinal section is of an increasing diameter towards the punch member 44, as can be clearly seen from FIG. 13, and which is matched in respect of its configuration and dimension to the configuration and dimension of the portion 62 of the punch member 44. The region 74 of the bottom portion of the tool on the one hand and the wall region 62 of the punch member 44 on the other hand extend substantially parallel to each other and in their operative final position as shown in FIG. 16 define an annular gap, the width of which in that region corresponds to the thickness of the flange indicated at 76 in FIG. 16, which is to be formed on the contracted portion 20 of the blank 10.

After the blank 10 has been moved from the first station 16 into the second station 40, it initially takes up the position shown in FIG. 8, being held by a suitable holding means (not shown), for example a gripper, of the conveyor device (also not shown). Associated with the station 40 are first and second holding means in the form of a bottom mandrel 77 and a holding mandrel 78 which are both displaceable vertically with a linear movement, independently of each other. The ends of both the mandrel 77 and the mandrel 78 are adapted to the shape of the bottom portion 12 of the blank 10, as can be clearly seen from FIGS. 8 through 10. The mandrel 78 is carried by a rod 79 which is disposed in a longitudinal bore in the punch member 44, displaceable axially with respect thereto. The two members 78 and 79 are provided with a duct or passage 89 for introducing compressed air into the blank 10. The bottom mandrel 77 is coaxially surrounded by a support sleeve 90 which is displaceable vertically with respect to the bottom mandrel 77.

As soon as the blank 10 takes up the position shown in FIG. 8, the mandrel 77 and the mandrel 78 are respectively displaced towards the bottom portion 12 of the blank 10 until the mandrels 77 and 78 come to bear again the bottom portion 12 and clamp it therebetween. In that situation the blank 10 is still in a position in which it is beneath the bottom portion 42 of the tool. Due to the fact that the bottom portion 12 is clamped between the mandrels 77 and 78, as described above, the blank 10 is also axially aligned with respect to the tool, by virtue of the shape of the co-operating mandrels 77 and 78. In other words, the co-operating mandrels 77 and 78 centre the blank 10 therebetween, relative to the tool formed by the bottom portion 42 and the punch member 44. After the bottom portion 12 has been clamped between the mandrels 77 and 78, the support sleeve 90 whose inside diameter is adapted to the outside diameter of the blank 10 is displaced upwardly to a position approximately at the beginning of the contracted end portion 20 of the blank, as shown in FIG. 9. From that position the first and second mandrels 77 and 78 and the support sleeve 90 are displaced synchronously upwardly, entraining the blank 10 therewith, until they reach the position shown in FIG. 10. The bottom portion 42 of the tool arrangement is closed in that case. It is locked in that position from below by the co-operation thereof with the support sleeve 90. For that purpose, an annular projection 91 on the sleeve 90, which is of a conical configuration at least at one side, engages into a correspondingly defined groove 92 in the bottom portion 42, as can be clearly seen in FIG. 10.

FIGS. 8 through 10 show that the contour of the bottom portion 42 of the tool is adapted in the regions 70, 71 and 72 of the wall of the opening therein, to the contour of the contracted end portion 20 of the blank 10 so that in the course of the upward movement of the members 77, 78 and 90, the contracted portion 20 of the blank can be readily introduced into the opening 45 in the bottom portion 42 of the tool, which is, as stated, already in a closed position.

When the blank 10 takes up the position shown in FIG. 10, the punch member 44 is moved downwardly from its upper initial position shown in FIGS. 9, 10 and 13 into the opening 45 in the bottom portion 42 of the tool and thus also into the opening of the coaxially disposed blank 10. FIG. 13 in particular shows that the diameter of the free end 54 of the punch member 44 is slightly smaller than the smallest diameter of the contracted end portion 20 of the blank 10 so that the punch member 44 firstly enters the opening at the end of the blank 10, without touching the wall defining the opening. Fine alignment of the blank 10 with respect to the punch member 44 may possibly also occur as the conical end portion 58 of the punch member 44 is introduced into the blank 10, although that is generally not necessary as axial alignment of the blank 10 with respect to the bottom portion 42 of the tool and thus also with respect to the punch member 44 thereof is effected as the contracted end portion 20 of the blank is introduced into the bottom portion 42 or at the latest when the support sleeve 90 moves upwardly.

During the first phase of the downward movement of the punch 44, the lower conical end region 80 of the annular locking element 50 is brought into engagement with the projection 56 on the top surface of the bottom portion 42. As the locking element 50 has reached its lower limit position before the punch member 44 concludes its downward movement, there is a relative displacement between the locking element 50 and the punch member 44; when that occurs, the coil spring 52 which is supported with its end remote from the blank 10 against the punch member 44 is compressed. The locking element 50 and the projection 91 on the support sleeve, which also acts as a locking element, perform the function of locking the two halves 42a and 42b of the bottom portion 42 relative to each other in the closed position of the tool, so that those halves remain closed in the subsequent pressing operations. That is achieved by virtue of the conical configuration of the projection 56 at the outside thereof and the conical configuration, which is adapted thereto, of the end region 80 of the locking element 50, and corresponding configurations in respect of the projection 91 on the support sleeve 90 and the groove 92 co-operating therewith.

In the course of the further downward movement of the punch member 44, the cylindrical portion 60 thereof then passes into the end portion 20 of the blank 10. The outside diameter of that cylindrical portion 60 is substantially the same as the smallest inside diameter of the contracted end portion 20 of the blank. After the punch member 44 has reached approximately the position shown in FIG. 14, compressed air is introduced into the interior of the blank 10 by way of the passage 89 in order to support the wall portion 14 thereof in such a way as to prevent bending or buckling thereof, in particular in the end region 20 which has been contracted in the first station 16, during the operation of forming the flange 76 thereon by a pressing effect. The blank 10 cannot buckle outwardly as the wall portion thereof is supported on its outside by the support sleeve 90 embracing it from the exterior (as can be clearly seen from FIGS. 10 and 11). The increased internal pressure in the blank 10 further ensures that the part of the end portion 20 of the blank, which is not subjected to deformation to form the flange 76, is pressed against the wall of the bottom portion 42 of the tool, and is cooled thereby.

Figure 15:
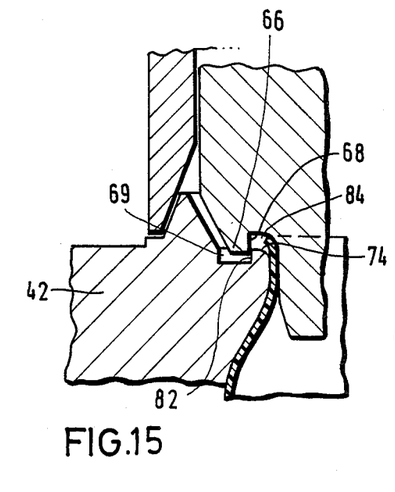
FIG. 15 shows the components illustrated in FIGS. 13 and 14 in a further intermediate position.

In the course of the further downward movement of the tool, the lower end region of the projection 66 firstly enters the groove 69, as can be seen from FIG. 15. The arrangement is such in that respect that the inner wall 68 of the projection 66 slides without clearance or with only a very slight clearance along the inner boundary wall 82 of the groove 69 associated with the projection 66 so that the annular space which is delimited by the wall portion 62 on the punch member 44 and the wall portion 74 on the bottom portion 42 of the tool is closed off in all directions, that is to say also outwardly, and thermoplastic material is thus prevented from escaping to the exterior from the contracted end portion 20 of the blank. In the course of the further downward movement of the tool into the position shown in FIG. 16, the free edge of the contracted end portion 20 of the blank is bent over outwardly between the two portions 62 and 74 to form the flange, as can be seen from FIG. 15, until the punch member 44 has reached its final position in which the material forming the peripheral flange 76 which is bent over outwardly is subjected between the bottom portion 42 and the punch member 44 to a pressing shaping effect which serves not only to bend over and shape the flange 76 but which also results in the flange being rendered uniform over its entire periphery in respect of its wall thickness or gauge and its radial extent, as in the final position of the punch member 44 there is a defined spacing between the wall portion 62 of the punch member 44 and the wall portion 74 of the bottom portion 42 of the tool. The radial extent of the flange is rendered uniform in that fashion by virtue of the inner wall 68 of the projection 66 preventing the material which is subjected to the pressing shaping effect escaping outwardly. The material also cannot escape inwardly towards the wall portion which has remained undeformed, or such displacement of the material is possible only to a negligible extent, for the reason that the annular gap between the cylindrical region 60 of the punch member 44 and the cylindrical region 72 of the bottom portion 42 is completely filled with material and, by virtue of its narrow width, presents such a high resistance to flow of material therethrough that the material cannot escape through the annular gap to any significant extent.

Figure 11:
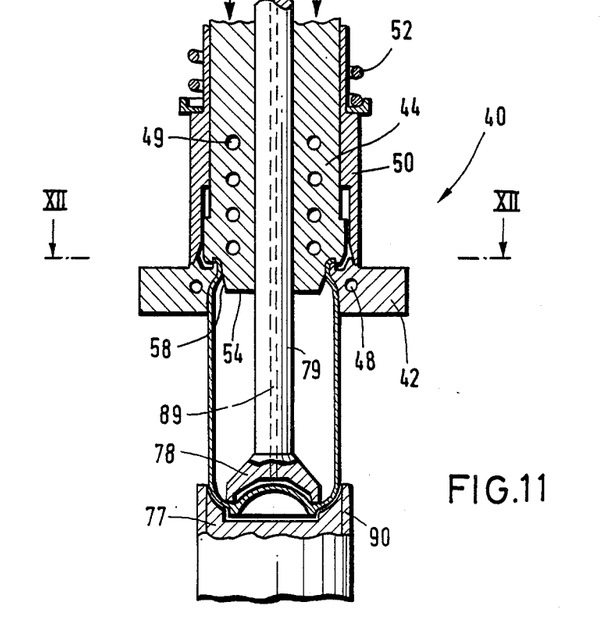
FIG. 11 is a view corresponding to that shown in FIG. 10 illustrating the two tools in their respective final positions.

The contracted end portion 20 of the blank 10 is introduced into the bottom portion 42 of the tool, and the punch member 44 is introduced into the contracted end portion 20, so quickly that, prior to the operation of shaping the material to form the flange 76, the thermoplastic material involved is not subjected to a cooling effect at any event to such an extent that shaping and forming of the flange could be adversely affected thereby. A cooling effect of noticeable extent only begins after the punch member 44 has moved into its final position as shown in FIGS. 11 and 16. Due to the cooling medium which flows through the passage 48 and 49 and which will generally be water, the material is then cooled down to a temperature at which it is again stable in respect of shape, at any event at such a rate that the finished blank 10 which is now of the configuration shown in FIG. 3 can be removed from the second treatment station 40 when the blank 10 which is being provided at the same time with the contracted end portion 20 in the first station 16 is ready for further processing thereof in the second treatment station 40.

Prior to the finished blank being removed from the second station 40, the pressure in the interior of the blank is released by opening a valve associated with the passage 89. Then, in an initial phase, the punch member 44 with the conical locking element 50 and the support sleeve 90 with the conical locking element 91 are moved upwardly and downwardly respectively, and disengaged from the bottom portion 42 of the tool. The bottom portion 42 of the tool is then opened by moving the halves 42a and 42b which constitute same away from each other in the direction indicated by the arrows 81 in FIG. 12, whereupon the blank 10 with the flange 76 formed thereon can be removed in a downward direction in for example FIG. 10.

For that operation, the bottom mandrel 77 and the holding mandrel 78 are moved synchronously downwardly substantially into the position shown in FIG. 9 in which the blank 10 is then engaged by the above-mentioned conveyor device or possibly also by another conveyor device for removal of the blank, whereupon then the bottom mandrel 77 is moved downwardly and the holding mandrel 78 is moved upwardly to release the blank 10.

Figure 3:
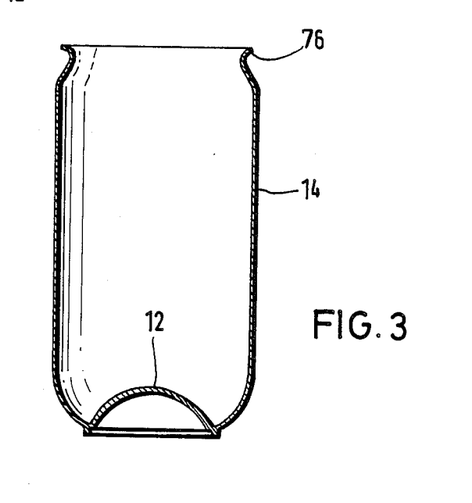
FIG. 3 is a side view of the article shown in FIGS. 1 and 2 after the second step of forming a flange thereon.

FIG. 3 in particular shows that the flange 76 does not project with the free end or edge thereof outwardly beyond the contour of the hollow body 10 in the region of the largest diameter of the wall portion 14. That makes it easy to transport the finished blanks. The blanks are articles which are to be produced and processed in very large numbers and which accordingly also need to be transported in large numbers. Ease of transportation is therefore a significant consideration.

It will be appreciated that the above-described process and apparatus and the article produced thereby have been set forth solely by way of example of the principles of the present invention and that various modifications and alterations may be made therein without thereby departing from the spirit and scope thereof.

What is claimed is:

1. A process for forming a flange on a hollow body of thermoplastic material the hollow body comprising a substantially cylindrical wall having first and second ends and an opening at the first end thereof, the thermoplastic material of the hollow body previously being thinned and oriented along the cylindrical wall, wherein said first end portion of said wall which defines said opening is heated and contracted by the application of forces to said first end portion from the outside thereof over the periphery thereof, thereby reducing the first end in diameter, and a flange is then formed at said contracted first end portion, extending around the contracted first end portion, by a pressing operation, said flange forming step comprising turning an edge of the contracted first end portion outwardly to a radial position located between a remainder of the contracted first end portion and an uncontracted portion of the cylindrical wall.

2. A process set forth in claim 1 wherein the step of contracting said first end portion is effected at the same time as the step of heating said first end portion and in dependence on the softening of the material forming said first end portion caused by the heating step.

3. A process as set forth in claim 1 wherein the step of contracting said first end portion of said hollow body is performed by a first tool means which is of substantially annular configuration in cross-section and is passed over said first end portion of the hollow body, the internal configuration of said tool means reducing in diameter towards the end thereof which is remote from the hollow body, thereby corresponding to a reduction in size to be produced at said first end portion and comprises biasing said first tool means by a force acting in a direction towards said hollow body; heating said first end portion by contacting an outer peripheral edge of the first end portion with a surface of said first tool means which is at a temperature suitable for softening the contacted material of said end portion; and the first end portion contracting progressively under the biasing force as the thermoplastic material of the first end is progressively heated and softened by said first tool means surface.

4. A process as set forth in claim 3 wherein the distance to be covered by said first tool means during the operation of contracting said first end portion is limited.

5. A process as set forth in claim 1 wherein the hollow body is under an increased internal pressure above ambient atmospheric pressure during the operation of producing the contraction of said first end portion.

6. A process as set forth in claim 1 wherein the step of forming the flange on said contracted first end portion of the hollow body is effected utilizing the heat supplied to said first end portion in the course of the step for causing said contraction.

7. A process as set forth in claim 1 wherein said hollow body with its contracted first end portion is moved into the region of operation of a second tool means comprising a bottom portion having an opening therein whose internal configuration is adapted to the shape of the flange to be formed on the hollow body, and a punch means having an end region which is introduced into said opening in said bottom portion and the first end portion disposed therein; (the) a portion of the punch means cooperates with the wall of the hollow body in an initial phase of introducing the punch means into the open first end and enlarges at least an edge region of said first end portion of the hollow body and in a subsequent phase of introducing the punch means forms the flange on said first end portion by pressing the first end portion between said bottom portion and said punch means of the second tool means; and wherein the contracted and flanged region of the first end portion of the hollow body is cooled until it is in a condition of adequate stability in respect of shape.

8. A process as set forth in claim 7 wherein said contracted and flanged region of the wall of said hollow body is cooled by the portion of said second tool means which shapes said flange.

9. A process as set forth in claim 1 wherein the hollow body is subjected to an increased internal pressure above ambient atmospheric pressure during the operation of forming the flange by pressing.

10. A process as set forth in claim 1 wherein during the operation of forming the flange by pressing said wall of said hollow body is supported by a support means disposed therearound.

11. A process as set forth in claim 1 wherein the step of contracting said first end portion of said hollow body on the one hand and the step of forming the flange by pressing on the other hand are carried out in first and second treatment stations separated in space from each other.

12. A process as set forth in claim 8 wherein the portion of said second tool means which shapes said flange is cooled for cooling said deformed region of the wall.

13. A process as set forth in claim 1 wherein the reducing step is performed without internally supporting the first end of the wall with a tool surface.

* * * * *